(12) United States Patent
Jefferson, III

(10) Patent No.: US 8,348,442 B2
(45) Date of Patent: Jan. 8, 2013

(54) LIGHTING APPARATUS AND SYSTEM

(76) Inventor: Andrew Leon Jefferson, III, Houston, TX (US)

( * ) Notice: Subject to any disclaimer, the term of this patent is extended or adjusted under 35 U.S.C. 154(b) by 571 days.

(21) Appl. No.: 12/590,780

(22) Filed: Nov. 13, 2009

(65) Prior Publication Data

US 2011/0116249 A1   May 19, 2011

(51) Int. Cl.
*G03B 15/02* (2006.01)
(52) U.S. Cl. ............... 362/18; 362/11; 362/16; 362/17
(58) Field of Classification Search .............. 362/18, 362/11, 16, 17, 296.07, 297
See application file for complete search history.

(56) References Cited

U.S. PATENT DOCUMENTS

2011/0292635 A1 * 12/2011 Hanabusa ............. 362/16

* cited by examiner

*Primary Examiner* — Vip Patel
(74) *Attorney, Agent, or Firm* — The Matthews Firm

(57) ABSTRACT

A flash apparatus and related systems and methods of use are disclosed herein. The apparatus includes a housing having a generally concave reflector, and a light source disposed within the reflector. A handle can be engaged with the housing and/or the light source to facilitate manual positioning and repositioning of the light source relative to a photographic apparatus remote from the housing and/or an object to be photographed. A synchronization device is in communication with the light source and the photographic apparatus for causing the light source to emit a flash of light when the photographic device is actuated. A modifier can also be engaged with the reflector for modifying the emitted flash of light. In a portable system, various interchangeable reflectors, modifiers, and light sources can be provided. Power sources for the light sources and a stand engageable with the handle can also be included.

35 Claims, 6 Drawing Sheets

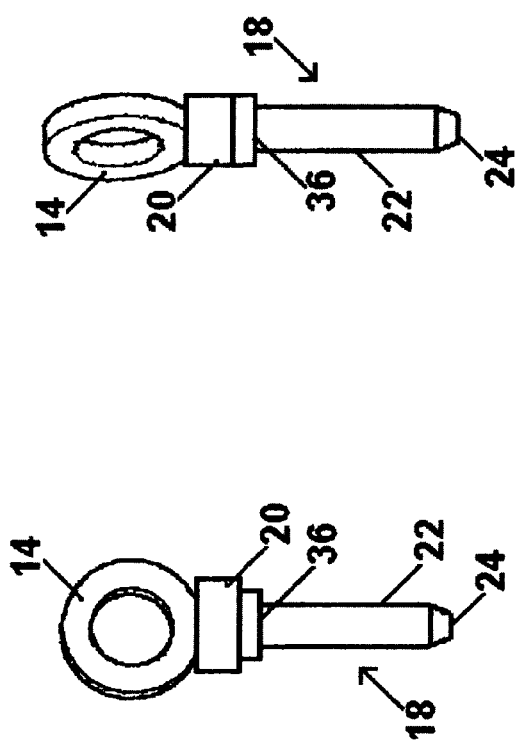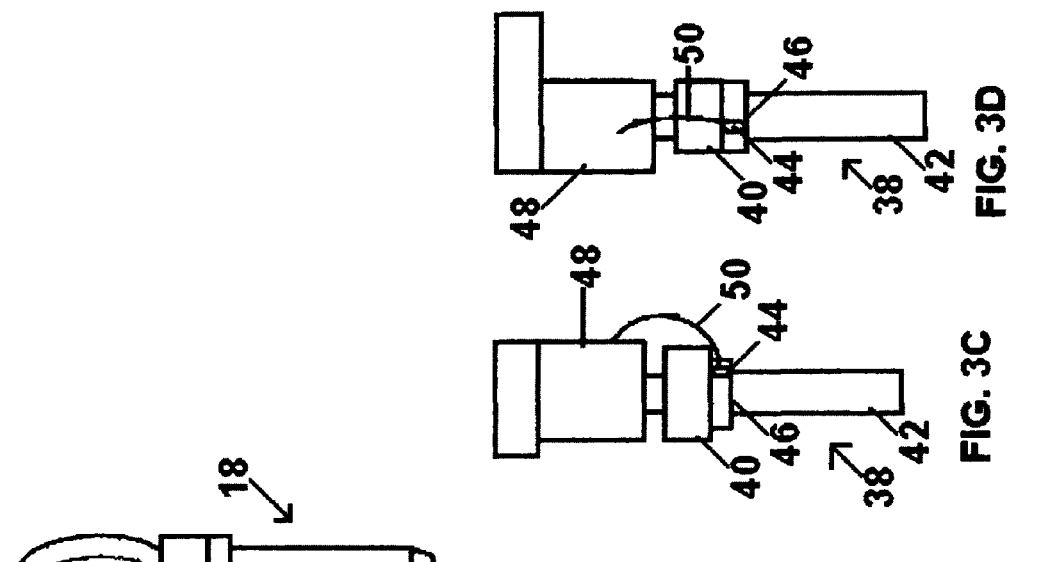

LIGHTING APPARATUS AND SYSTEM

FIELD

The present invention relates, generally, to a lighting apparatus and portable systems and methods of use. More particularly, the present invention relates to a handheld flash apparatus and system for use with photographic, video and related devices.

BACKGROUND

Conventional flash photography techniques typically utilize camera-mounted speed lights, or similar flash devices, strobe lights, or other types of lighting, that are configured to flash upon actuation of the camera. In combination with various studio lights, such as strobes, and light modifiers, such as soft boxes and other types of reflection of ambient lighting, desired light and shadow affects can be created when photographing an individual, couple, group, or an object.

Extremely precise creation and manipulation of light and shadow, and manipulation of the physical wrapping quality of light, can dramatically enhance the quality of photographs. However, such techniques typically require bulky and expensive equipment, are often restricted to studio use, and typically require at least two individuals to position and operate the equipment effectively. When performing event photography or other types of photography outside of the studio, it has been desirable to increase the portability and ease of handling for the required equipment by minimizing or eliminating remote lighting, and instead mounting increasingly complex light sources directly on a camera, enabling a photographer to maneuver and acquire photographs quickly. Alternatively, it is possible, though often undesirable, to transport cumbersome photography equipment to a job site and to work with one or more assistants to set up, position, and reposition the equipment between photographs, which constitutes a labor-intensive and time consuming endeavor, and requires a significant quantity of time to reconfigure equipment between photographs. Moreover, in an attempt to approximate studio quality, it is possible to use several on-camera types of portable flashes, or speed lights, off of the camera, thereby reducing bulk.

A typical photographic flash apparatus includes a tubular light bulb, mounted within a curved, trough-shaped reflector, which is secured to a camera housing and oriented to emit a flash of light in the direction that the camera lens is facing. Some existing flash apparatuses enable the bulb to be positioned such that the flash of light is emitted in a direction other than into the eyes of the subject or that which the lens is facing, for illuminating the target with indirect, or reflected light, rather than direct light, and thereby reducing the possibility of red-eye. Attachable to or integral with many flash apparatuses are a variety of diffusers and other modifiers usable to affect the emitted light and the manner in which the light interacts with the object to be illuminated.

One of the drawbacks of existing camera-mounted flash apparatuses is that the greater portability and simpler nature of such an apparatus usually results in a diminished quality of light. Quality of light is crucial for acquiring photographs having a high degree of clarity and precise graduation of color and shading. A high quality of light is especially critical when producing black and white images, which require a clear graduation of grayscale and precise use of light and shadow to obtain a valuable image.

The quality of light provided by a flash bulb can depend on the length of the bulb filament, the shape of the bulb, which affects the spread of the light produced, and the intensity of the flash, which can be affected by the power requirements and capacity of the bulb. The emitted flash can then be affected by the shape and type of reflector used, the orientation of the bulb in relation to the reflector, and any diffusers or other modifiers placed between the bulb and the object to be illuminated. Additionally, the interaction between the flash and the illuminated object can be affected by the distance between the object and the light source, the position of the light source relative to the object and relative to the camera, and the power or intensity emitted by the light source.

A conventional camera-mounted flash apparatus is typically very limited regarding the spread, intensity, and quality of the light provided. Further, a camera-mounted flash apparatus is normally integral with a single choice of reflector. Also, a camera-mounted flash apparatus is limited regarding the positioning of the flash relative to object to be photographed and relative to the direction from which the photograph is acquired. While remote flash devices can be used in lieu of, or in addition to a camera-mounted flash apparatus, a studio quality remote flash device or strobe is typically expensive, bulky, time consuming to set up, position, and reposition, and an assistant is normally required to manipulate and/or move the remote devices between uses.

Handheld flash devices have been utilized to obtain certain desired light and shadow effects, however existing handheld flash devices have lacked sufficient power and flexibility to compete with the preferred camera-mounted speed lights and large, non-portable light apparatuses. Existing handheld flash devices have failed to overcome the drawbacks of camera-mounted flash devices and cumbersome, less portable equipment without sacrificing the advantages of their more common camera mounted speed-light counterparts. For example, a hand held light that is attached to the camera on an L-bracket, or alternately, is used as a flash gun but without interchangeability with respect to a reflector and bulb creates no opportunity to enhance the quality of the light. It has been advantageous for the bracket to balance the camera with respect to the flash, and the photographer could support the weight of the camera with one hand—thereby sharing the weight between the hands. The known devices were never designed to be flexible, but rather to be attached to the side of the camera to primarily avoid red eye.

A need exists for a flash apparatus that can be manually positioned and repositioned relative to both the object to be illuminated and the angle between the light source and the object to be illuminated, for rapidly and efficiently, minimizing the downtime and necessary reconfiguration between illuminations. The spontaneous capture of images with a higher, studio quality of light creates new photographic possibilities, especially given the high importance and time sensitivity of maintaining rapport with a human subject.

A further need exists for a system for manual manipulation of flash photography that is flexible. It is desirable to provide flexibly that incorporates interchangeable reflectors, light sources, modifiers, and/or power sources, while retaining sufficient portability to enable a single individual to transport, set up, position, and reposition the system with a minimum of time between illuminations.

A need also exists for a flash apparatus that can provide a superior quality of light compared to conventional camera-mounted flash devices. It is desirable to overcome the drawbacks of the conventional alternatives by enabling creative and effective positioning and repositioning of light when time is a limiting factor that would prevent conventional preparation and methods.

A primary feature of the present invention is to provide an apparatus and system that brings studio quality lighting to handheld devices.

It is a feature of the present invention is to provide an apparatus and system to improve the quality and efficacy of portable flash devices.

It is a feature of the present invention to provide an apparatus and system that provides an illumination source that creates a higher quality graduation of grayscale in the ultimate photograph. The higher quality grayscale is affected due to the light being "wrapped around" the subject being illuminated. Particularly, the apparatus and system of the present invention does not just flood the area with flat light, but rather, provides light having an intensity that provides softer shadows on the subjects being illuminated. The softer shadows are provided due to the "wrap-around" effect of the light provided. Particularly, the wrap-around effect of the present invention provides more shades of gray when capturing the image of the illuminated subject. The light provided by the present invention isolates the subject being illuminated, without flooding the illuminated frame or area with light, thereby resulting in a far less "flat-looking" photograph.

Another feature of the present invention is to provide an apparatus and system having a high intensity of light to achieve more shades of gray. It is not unusual to have to distinguish between the subject being illuminated and the background. This dichotomy between background and subject is typically a problem, but is especially advantageous with the present apparatus and system providing for softer, yet more distinguishable, shadows on the illuminated subject.

An unexpected feature of the present invention is to provide an apparatus and system for enhancing and refining the shadows associated with the subject being illuminated. It is known in the art to use ring lights to eliminate the shadows associated with the illuminated subject. The prior art is prolific with examples of using a ring light on the end of a lens of a camera to illuminate and eliminate the shadows associated with the illuminated subject. However, the present invention provides the unexpected result of using a ring light to enhance and refine the shadows. The present apparatus and system provides for isolated lighting with respect to the subject being illuminated. The isolated lighting provides that the shadows and graduations are better defined, not eliminated.

The present invention provides for quality, speed, flexibility, duration and consistency. The quality is provided with respect to the use of the specific type of bulb, i.e., the ring light. The speed and flexibility is provided by a battery system that provides consistent power for the rapid capture of illuminated objects up to and until the time the battery system terminates itself. The present system provides for multiple backup cells that are independently arranged so that each illumination is provided power from an independent backup cell. Such a configuration provides for increasing the illumination or frame rate associated with digital cameras and other equipment. Further, the battery system provides for duration of charge that is consistent and predictable. Each pre-charged backup cell or bank is sequentially discharged to provide a uniform and highly effective flash.

The present invention meets these needs.

SUMMARY

The present invention relates, generally, to a photographic flash apparatus that includes a housing having a generally concave reflector. The housing can have any dimensions and any shape desired, however in a preferred embodiment of the invention, the housing can be sized and configured to be held in a single hand of the photographer for providing directional and reflected flashes for photographic illumination. For example, the housing can be generally circular, having a bowl shape, with a reflective material lining the inner surface. The speed light allows the photographer to leverage his existing equipment, because it provides more versatility and adaptability.

The generally concave reflector can include a dimpled reflector, a white reflector, a parabolic reflector, a polished reflector, a gold reflector, other similar reflectors usable with a photographic flash, or combinations thereof. Due to the portable and lightweight nature of the present apparatus, the housing and/or the reflector can be interchangeable. For example, multiple housings containing different types of reflectors could be easily transported to a job site by a single individual and interchanged between photographs. Modifiers can be attached to the reflector, but may be attached to a speed ring attachment that may be on the reflector.

A light source is disposed within the generally concave reflector. The light source can include various types of portable photographic flash devices, including for example conventional speed lights. In an embodiment of the invention, the light source can be a circular or ring-shaped bulb, such as a SRF-11 macro ring light, made by Olympus, or a similar ring-shaped photographic flash. A ring light provides a superior quality of light due to the extended length of the bulb filament and the round shape of the bulb, which favorably affects the spread of the emitted light. By positioning a ring light in the generally concave reflector so as to emit a circular reflected light source, the quality of light is further improved beyond that provided by a the conventional speed light.

In a further embodiment of the invention, the light source can include an adjustable light source for selectively varying the intensity of the emitted flash. Use of an adjustable macro ring light with a high power capacity, such as the SRF-11 or similar light, enables a user to benefit from the ring light's long filament and circular shape, while maximizing the quality of light obtained through selective control of the intensity of the emitted flash. In an embodiment of the invention, the present apparatus can also include an integral or external portable power source to provide power to the circular or ring-shaped bulb, or to another light source.

In a further embodiment of the invention, an external, easily accessible switching device, such as a pedal, can be used to actuate, dim, brighten, and/or otherwise control the circular or ring-shaped bulb and/or one or more external light sources. For example, a pedal can be used to switch a plurality of light sources between a series of preselected intensities, thereby enabling a single user to utilize and manipulate both the light source within the housing and one or more additional light sources.

In a further embodiment of the invention, the apparatus can include an internal power management system, which can manage the use of battery power, enabling the apparatus to function as if receiving power from an AC power source, thereby eliminating flash recycle issues, delays, flash power loss and similar difficulties associated with battery life. A processor can be provided, in communication with voltage control and charging circuits, while receiving input from a voltage level indicator circuit and a wireless adapter circuit. Responsive to the voltage level, the processor can then interface with flash control and/or flash bank selector circuits to provide a contemporaneous flash without any flash recycle issues commonly associated with the remaining battery life. A weak battery results in diminished flash quality resulting in an inconsistently lit photograph due to decreased flash power, especially when taking photographs in rapid succession. The present invention provides for consistency of flash with out delay thereby ensuring the quality and availability of a quality flash irrespective of the battery power. Conventionally, macro ring lights are designed to be mounted around the lens of a camera for macro use, to facilitate portability, and are nearly always oriented to face a subject or object to be photographed. As a result, most macro ring lights have a low power capacity, limited control over the intensity of the light dissipated by the flash, and are only usable to provide direct illumination. The present invention enables precision control of the quality of light by mounting a light source within a portable concave reflector, remote from the camera, enabling rapid and precise positioning of the reflector and thus the light source with respect to the object to be photographed, and with respect to the displaced camera.

The light source can be mounted within the reflector on a rotatable mount. For example, a circular or ring-shaped bulb could be oriented to emit a flash of light toward the generally concave reflector, for illuminating an object with reflected light. Alternatively, the circular or ring-shaped bulb could be oriented to emit the flash of light away from the reflector, for illuminating the object with both direct and reflected or indirect light. Other orientations, using both circular bulbs and bulbs having other shapes and configurations are also usable.

A direct cable connection or synchronization device can be utilized to communicate between the light source, the camera or similar photographic device remote from the housing and light source, and/or any additional lighting devices, if used, such that when the photographic device is actuated, the light source emits a flash of light having specific characteristics. The synchronization device can include any type of wired or wireless device, including various paired wireless radio or Bluetooth transmitters and receivers.

A handle can be secured to the housing to facilitate manual positioning and repositioning of the apparatus during use, enabling rapid acquisition of a variety of photographs while varying the distance, direction, intensity, and orientation of the flash quickly, without requiring a second light source. Useable handles can have any length, shape, or thickness, can be fixed or adjustable, and can be interchangeable. In an embodiment of the invention, the handle can be secured through a bottom opening in the housing, having a first portion extending within the reflector and a second portion extending exterior to the reflector. The first portion can include electrical contacts or a hot shoe, for engaging the light source. For example, when engaging a conventional speed light, the interior portion of the handle can include a cold shoe and a PC connection or similar interface for enabling functionality of the speed light. When engaging a ring light, the interior portion of the handle can include a hot shoe for providing power to the ring light. It should be noted that a hot shoe could function as either a hot shoe or cold shoe, as needed, further facilitating interchangeability of light sources or sync devices having differing electrical requirements.

In a further embodiment of the invention, a light panel comprising of an array of LEDs can be utilized as an attachment replacing the macro ring light source. Such attachment can function as an "always-on light source" for capturing a video segment from a video camera or video capable digital still camera, thereby extending the versatility of the light system. Moreover, such LED attachment has an alternative use as a dynamic light source for video recording. The LED array of diodes can be sequenced in a moving "billboard-type" manner allowing the light diodes to create the illusion of motion as well as many other dynamic effects for the lighting of video recordings.

In a further embodiment of the invention, an extended handle, having a grip portion along its midpoint or elsewhere along the length of the handle, is provided. The handle can be of any size and shape, however in a preferred embodiment of the invention, the handle can be generally straight and cylindrical, by way of example and without limitation, approximately 27 inches in length and 1 inch in diameter. The handle can be hollow and contain internal batteries that are controlled by dials and/or switches disposed on the grip. The handle can further have connectors for accommodating a carrying strap, handles, or similar carrying members to enable carrying of the apparatus without occupying a user's hands. Use of a handle provides a single user with improved versatility, precision, balance, freedom, and reach, far in excess of conventional photographic apparatuses.

The flash can further be controlled through metering of its length and intensity. In an embodiment of the invention, the light source can include a self-contained flash unit having a light sensor, which detects reflected light from an object to be photographed. The sensor can cause the flash to automatically cease producing light when it is determined that a correct exposure has taken place.

In addition to facilitating gripping and manipulation of the present photographic flash apparatus, the exterior portion of the handle can include power connections and additional PC connections for any lights mounted thereon. Furthermore, the handle, a controller, such as a pedal, or another portion of the present apparatus can include connections to a display device, such as a video device. The system can manually or automatically be used to review, save, transmit, and/or manipulate acquired photographs on a display device. Usually, one would tether the camera to a laptop computer to enlarge the photo. The present invention provides for connecting the camera output to a pedal and the pedal transmits the signal to a display for all to see. The present invention provides for leveraging the technology already in cameras by outputting a video signal, which can even be a HD signal since many cameras have HD outputs. The HD signal can be wirelessly transferred to a display screen as part of the present invention. Alternately, the present invention can be used for video light, for prelighting to test the image before taking the photograph or for other lighting requirements.

A complete photographic system as practiced by the present invention comprises a camera, a lighting system, a controller or pedal, a big screen display and a device for creating ambiance/music. Such a complete photographic system creates very effective photos. Further, the present invention can also include a connection for a digital audio device as well as having small speakers within the handle, thus, allowing the system of the present invention to provide music ambiance creating a complete studio environment. The pedal connection may be an audio connection.

In an embodiment of the invention, the handle can be sized to be secured within an inexpensive, telescoping stand, such as a microphone stand. Use of a stand can enable the present portable photographic flash apparatus to be used in a manner similar to a stationary flash. Additionally, use of a lightweight, portable, telescoping stand, such as a microphone stand, can enable a photographer to extend his or her reach when positioning and repositioning the flash, enabling the apparatus to be raised to a large height or positioned a greater distance behind, in front, or to the side of an object being photographed than the distance normally possible when holding the handle of the apparatus directly. Such microphone stands and similar telescoping, freestanding devices, are designed for making quick adjustments, unlike many studio light stands.

The present photographic flash apparatus can also include one or more modifiers, which can securely engage and cover the housing, to modify the emitted light. For example, a diffuser, grid, snoot, or beam opening can be placed over the housing and reflector to affect the emitted flash. A diffuser having a transparent or opaque center can be used to accentuate the spread of light provided by a ring light by enabling a generally circular spread of light to be emitted through the modifier toward an object to be photographed. Additionally, one or more colored gels or similar modifiers can be provided in addition to any other modifier used. For example, one or more gels can be readily secured over the front of the device using an integral or external elastic band.

In the same manner as the housing/reflector and the light source, the modifier can be interchangeable. The portable nature of the present photographic flash apparatus enables a user to transport and select from a variety of modifiers, which can be readily interchanged between photographs.

The present invention also relates to a portable system for manual flash photography that utilizes an interchangeable concave reflector having a bottom opening. A handle, as described previously, can be secured through the bottom opening, having a first portion extending into the interior of the reflector for securing to an interchangeable light source. In an embodiment of the invention, differing light sources can be interchangeably connected to a single handle. In an alternate embodiment of the invention, both the handle and attached light source can be interchangeable with a differing handle and light source. An interchangeable modifier can also be provided, disposed over the reflector for modifying the flash of light. By way of example and without limitation, an LED source can function or be programmed to have a videolight relationship.

The present portable system is thereby able to be easily and efficiently transported, installed, configured, and reconfigured by a single photographer, with a minimum of downtime between photographs. Operation of the system can be further enhanced by use of an adjustable or interchangeable handle, enabling a user to extend his or her reach to obtain more precise and creative framing of photographs and lighting. Further, in an embodiment of the invention, the system can include a microphone stand or similar securing device for engaging the device, enabling a user to position the flash apparatus remote from both the camera and the object to be photographed.

The present invention also relates to a portable method for performing flash photography, the method including providing a handheld flash apparatus, as described previously, which includes a light source disposed within a generally concave reflector. The light source is synchronized with a camera or similar photographic apparatus, such that the light source emits a flash of light, or series of flashes or constant light when the photographic apparatus is actuated. The handheld flash apparatus is positioned in a first position relative to the camera and to the object to be photographed. The photographic apparatus is then actuated to acquire a photograph of an object, which causes the light source to simultaneously emit the flash of light for illuminating the object.

The handheld flash apparatus can be readily repositioned in a second position relative to the camera and to the object to be photographed, and the photographic apparatus is then actuated to acquire a second photograph while the light source emits the flash of light, illuminating the object. A long-handled embodiment is readily available to strategically or surgically place the light where it is best needed.

It is primary to the present invention to enhance the quality of the light so as to enhance the quality of the resultant photograph. Enhancing the quality of the light effects photograph clarity, color, shading, etc. The distance between the object and the light source is important. Thus, the angle between the light source, the object being photographed and the camera lens is important as accomplished by the present invention, but not present in the prior art. Thus, the distance, the intensity or power, the angle created and the spread are all important and controllable with respect to the present invention.

Further, it is primary to the present invention to position, reposition, et cetera the light source. The position-reposition ability of the present invention creates specific light characteristics at fixed locations. Further, the position-reposition ability of the present invention creates a unique light characteristic due to the change in the time-averaged energy flux associated with the changing intensity associated with the moving waveform of light. As well as the ability to control the power intensity of the light on the fly.

The present invention thereby provides a handheld photographic flash apparatus that can be rapidly and efficiently positioned and repositioned, selectively providing direct and/or reflected light, using a variety of interchangeable reflectors and/or modifiers, and can incorporate use of light sources that provide a superior quality of light, such as circular or ring-shaped bulbs. Conventional camera-mounted flash devices lack the flexibility and quality of light provided by the present invention, while conventional off-camera devices lack the portability and efficiency of the present invention. Further, typical handheld flash devices lack the power, flexibility, and quality of light provided by the present invention. The present invention overcomes many of the drawbacks of existing photographic flash devices while providing enhanced quality, portability, and flexibility.

BRIEF DESCRIPTION OF THE DRAWINGS

In the detailed description of the specific embodiments of the present invention presented below, reference is made to the accompanying drawings, in which:

FIG. 2A depicts a front perspective view of an embodiment of a light source and handle usable with the present photographic flash apparatus.

FIG. 2B depicts a side perspective view of the light source and handle of FIG. 2A.

FIG. 3A depicts a front perspective view of an alternate embodiment of a handle usable with the present photographic flash apparatus.

FIG. 3B depicts a side perspective view of the handle of FIG. 3A.

FIG. 3C depicts a front perspective view of the handle of FIG. 3A with a light source attached thereon.

FIG. 3D depicts a side perspective view of the handle and light source of FIG. 3C.

The described embodiments of the invention are detailed below with reference to the listed Figures.

DETAILED DESCRIPTION OF THE EMBODIMENTS

Before explaining the depicted embodiments of the invention in detail, it is to be understood that the present invention is not limited to the particular embodiments depicted and described and that the present invention can be practiced or carried out in various ways.

Figure 1A:
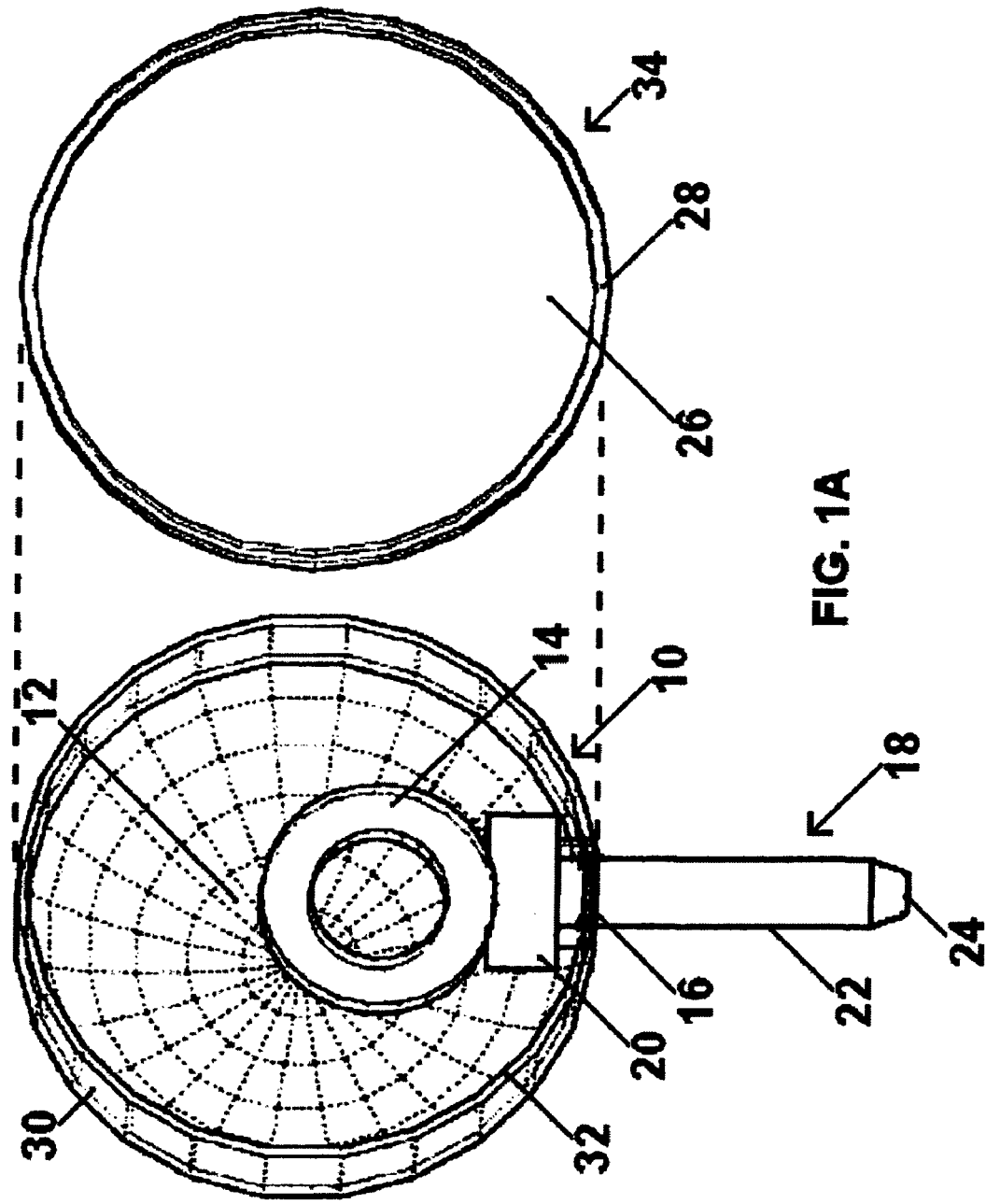
FIG. 1A depicts a front perspective view of an embodiment of the present photographic flash apparatus.
Figure 1B:
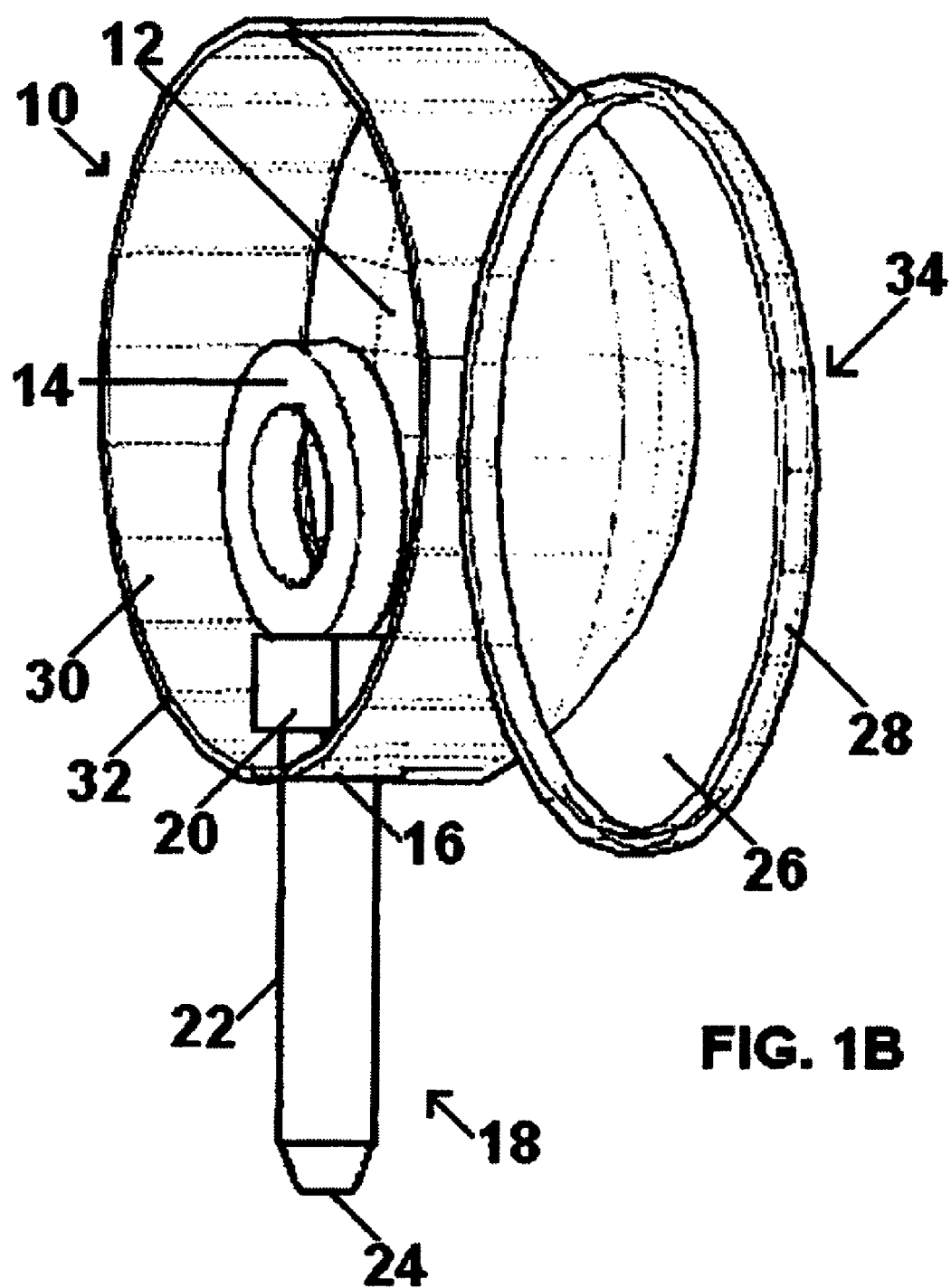
FIG. 1B depicts a side perspective view of the photographic flash apparatus of FIG. 1A.

Referring now to FIGS. 1A and 1B, a preferred embodiment of the present photographic flash apparatus is depicted.

An embodiment of the present apparatus is shown in FIGS. 1A and 1B having a housing (10), which is depicted as a generally concave, bowl-shaped structure, sized to be easily movable using a single hand-gripping handle (18) protruding therefrom. In an embodiment of the invention, the housing (10) can range in diameter from six inches to eighteen inches, however larger and smaller dimensions are also usable, depending on specific photographic and/or portability requirements. The housing (10) is shown having a sidewall (30) and a rim (32) disposed around a generally concave reflector (12). The generally concave reflector (12) includes any reflective photographic surface, including, but not limited to, a dimpled reflector, a polished reflector, a parabolic reflector, a white reflector, and/or a gold reflector. The entirety of the interior surface of the housing (10) can be formed from reflective material, or in an alternate embodiment of the invention, the housing (10) can include a first interior structure, while the generally concave reflector (12) is disposed atop the interior of the housing (10) in the manner of a substrate. The exterior surface of the housing (10) can be generally opaque to prevent the passage of ambient or emitted light therethrough.

The sidewall (30) of the housing (10) is shown having a threaded opening (16), through which the handle (18) has been threaded, such that an interior portion (20) of the handle (18) protrudes over the generally concave reflector (12) for securing a light source (14) within the housing (10). Other means of engagement between the housing (10) and the handle (18) are also usable, including clips, adhesive, hook and loop fasteners, a wedged or force fit, or other similar methods of attachment. While FIGS. 1A and 1B depict the light source (14) as a ring light, the handle (12) can be adapted to engage other types of lights, including speed lights. Further, while FIGS. 1A and 1B depict the light source (14) oriented to emit a flash away from the generally concave reflector (12), in an embodiment of the invention, the light source (14) can be selectively attached to the handle (18) facing toward or away from the generally concave reflector (12), or in any orientation therebetween. An exterior portion (22) of the handle (18) protrudes exterior to the housing (10) to facilitate manual gripping and positioning of the housing (10), and connection between the light source (14) and a power source, camera or other photographic device, and/or a synchronization device for synchronization with a camera.

The interior portion (20) of the handle (18) can include electrical contacts and/or mounting members for engagement with the light source (14), enabling differing light sources to be interchanged as needed. For example, the interior portion (20) can include power connectors, if necessary, such as a hot shoe for engagement with a ring light requiring a connection to a separate power source. Communication connectors, such as a PC connection for a speed light, can also be included in the interior portion (20). For speed lights having an integral power source, a hot shoe mount can be included in the interior portion (20). In an alternate embodiment of the invention, the light source (14) and the handle (18) can be integral with one another, such that the entire handle (12) and light source (14) can be interchanged with a differing handle having a differing type of light source attached thereon with appropriate power and communication connections extending through the handle (12). The base of the exterior portion (22) of the handle (12), or another area external to the housing (10) can include a connector (24), such as a 3-prong SLR connector, for engagement with a power source, and/or a PC port of a photographic device or synchronization device, thereby enabling the light source (14) to receive power, if necessary, and to establish connectivity with a camera or similar device, through connection to the interior portion (20) of the handle (18). In an embodiment of the invention, the handle (18) can be hollow and include an internal power source therein.

The higher quality graduation of grayscale achieved in the photograph achieved by the present invention is because of the configuration used. The higher quality grayscale is affected due to the light being "wrapped around" the subject being illuminated. The "wrapped around" effect is achieved by the layers of light generated by the combination of the ring light (14), the parabolic surface (12) and the sidewall (30). Particularly, the apparatus and system of the present invention does not just flood the area with flat light as is the case when the ring light is typically used attached to a camera. But rather, the combination of the ring light (14), the parabolic surface (12) and the sidewall (30) provides cascading light having an intensity that provides softer shadows on the subjects being illuminated. The softer shadows are provided due to the "wrap-around" effect of the light provided. Particularly, the wrap-around effect of the present invention provides more shades of gray when capturing the image of the illuminated subject. The light provided by the present invention isolates the subject being illuminated without flooding the illuminated subject with light.

The present invention provides an apparatus and system having a high intensity of light to achieve more shades of gray. This dichotomy between background and subject is typically a problem, but is especially advantageous with the present apparatus and system providing for softer, yet more distinguishable, shadows on the illuminated subject. The combination of the ring light (14), the parabolic surface (12) and the sidewall (30) provides cascading light having an intensity that provides for more distinguishable shadows on the subjects being illuminated.

It is unexpected of the present invention is to provide an apparatus and system for enhancing and refining the shadows associated with the subject being illuminated. It is well known in the art to use ring lights to eliminate the shadows associated with the illuminated subject. The ring light used on the end of a lens of a camera to eliminate the shadows associated with the illuminated subject is well known in the art. However, the present invention provides the unexpected result of using a ring light (14) to enhance and refine the shadows. The present apparatus and system provides for isolated lighting with respect to the subject being illuminated. The isolated lighting provides that the shadows and graduations are better defined, not eliminated.

FIGS. 1A and 1B also depict a modifier (34) adapted to be disposed over the generally concave reflector (12) for modifying the light emitted by the light source (14). The modifier (34) can include a diffuser, a grid, a beam, a snoot, or similar types of modifiers. In an embodiment of the invention, the modifier (34) can be a diffuser having an opaque center, for passing the light emitted by the light source (14) in a circular shape. The modifier (34) is shown having a modifying surface (26) and a lip (28). The lip (28) is configured for engagement with the rim (32) of the housing (10). While the lip (28) and the rim (32) can form a locking or snap-like engagement, other fastening members, such as clips, clamps, hook and loop fasteners, adhesive, or similar methods of fastening are also usable.

Referring to FIGS. 2A and 2B, an embodiment of the handle (18) and light source (14) depicted in FIGS. 1A and 1B is shown. The light source (14) is depicted as a small ring light module, however other types of light sources, including speed lights, can also be engaged with the handle (18). In one embodiment of the invention, the light source (14) can be integral with the handle (18), such that both the handle (18) and light source (14) can be interchanged to provide the present photographic flash apparatus with different types of light sources. The handle (18) is shown having a threaded portion (36) for engaging with an opening in the housing (depicted in FIGS. 1A and 1B). Other methods of engagement between the handle (18) and housing are also usable, as described previously and known by those skilled in the art.

The handle (18) is shown having an interior portion (20), which can contain suitable power connections, such as a hot shoe for ring lights and/or speed lights requiring integral power sources. The interior portion (20) can also include a communication and/or synchronization connector, such as a PC connection or wireless trigger jack for a speed light. The handle (18) is also shown having an exterior portion (22), which can be used for manual gripping and/or engagement with a stand or telescoping device. The exterior portion (22) is shown having a connector (24) at is base end, which can include a 3-prong SLR connector for accommodating the power and/or synchronization needs of the light source (14).

Referring now to FIGS. 3A and 3B, another embodiment of a handle (38) usable with the present photographic flash apparatus is shown. The handle (38) includes an interior portion (40) adapted to protrude within the generally concave reflector (depicted in FIGS. 1A and 1B) of the housing for mounting of a light source, and an exterior portion (42) adapted to protrude exterior to the housing for enabling manual gripping and manipulation of the housing. The handle (38) is shown having a threaded portion (46) for securing to complementary threads within the housing, however other methods of engagement are also usable.

The interior portion (40) can include power connections, such as a hot shoe for a speed light and/or ring light, enabling differing light sources to be interchangeably utilized. The interior portion (40) is also shown having a PC connector (44) usable to establish synchronization between a speed light or similar light source and a camera or other photographic apparatus.

Referring now to FIGS. 3C and 3D, the handle (38) of FIGS. 3A and 3B is shown having a light source (48) attached thereon, mounted to the interior portion (40) and connected to the PC port (44) using a PC connection (50). The light source (48) is depicted as a speed light, however it should be understood that other types of light sources, including ring lights could be interchangeably attachable to the handle (38).

In a preferred embodiment of the present invention, a system can be provided that includes one or more interchangeable generally concave reflectors and interchangeable modifiers, as depicted in FIGS. 1A and 1B, an integral handle and ring light interchangeably attachable to the housing, as depicted in FIGS. 2A and 2B, and at least one additional handle having power and/or synchronization connections suitable for interchangeable engagement with speed lights and other types of light sources, as depicted in FIGS. 3A through 3D. The integral handle and ring light can include a hot shoe mount and appropriate electrical connections coupled with a connector for engaging a separate power source, while the additional handle can include a cold shoe mount and a PC port for power and synchronization connections with a speed light or other types of light sources. Such a system can enable a single photographer to efficiently transport and set up a selected reflector, a light source, and a modifier to obtain one or more photographs, then quickly reposition and/or reconfigure the selected equipment to obtain additional photographs.

Figure 4A:
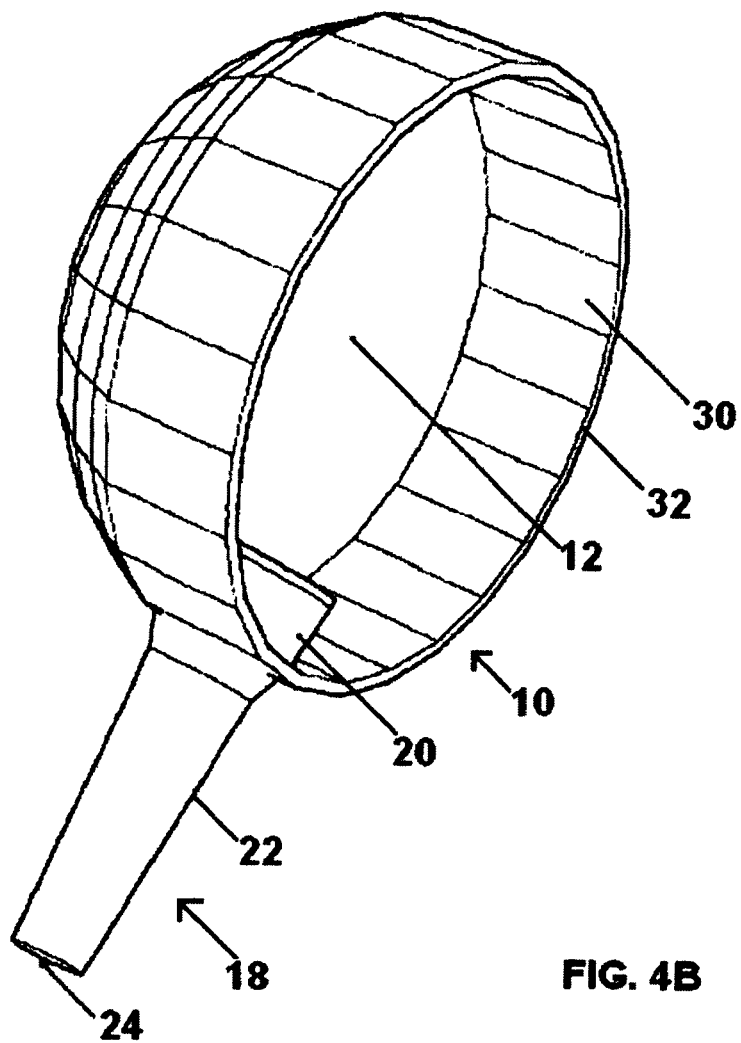
FIG. 4A depicts an embodiment of a handle and housing engageable with a stand for remote flash photography and/or for extending a photographer's reach.

Referring now to FIG. 4A, the housing (10) of the present photographic flash apparatus is depicted engaged with a handle (18). The housing (10) includes a generally concave reflector (12) encircled by a sidewall (30) having a rim (32), as described previously. The handle (18) includes an interior portion (20) disposed within the generally concave reflector (12) for engagement with a light source and an exterior portion (22) for manual gripping and positioning of the housing (10) and for engagement with appropriate power sources and/or synchronization devices using a connector (24) shown at the base of the exterior portion (22).

While the dimensions of the handle (18) can vary depending on the size and weight of the housing (10) and contained light source and the requirements of the specific photographic task to be undertaken, in a preferred embodiment of the invention, the handle (18) can be sized for engagement with a portable stand, which can be used to retain the housing (10) and light source in a fixed position relative to a camera and to the object to be photographed. A portable stand can also be physically carried by a photographer to provide additional reach, enabling the photographer to position the housing (10) and contained light source at an extended vertical or lateral distance with respect to the camera and to the object to be photographed.

Figure 4B:
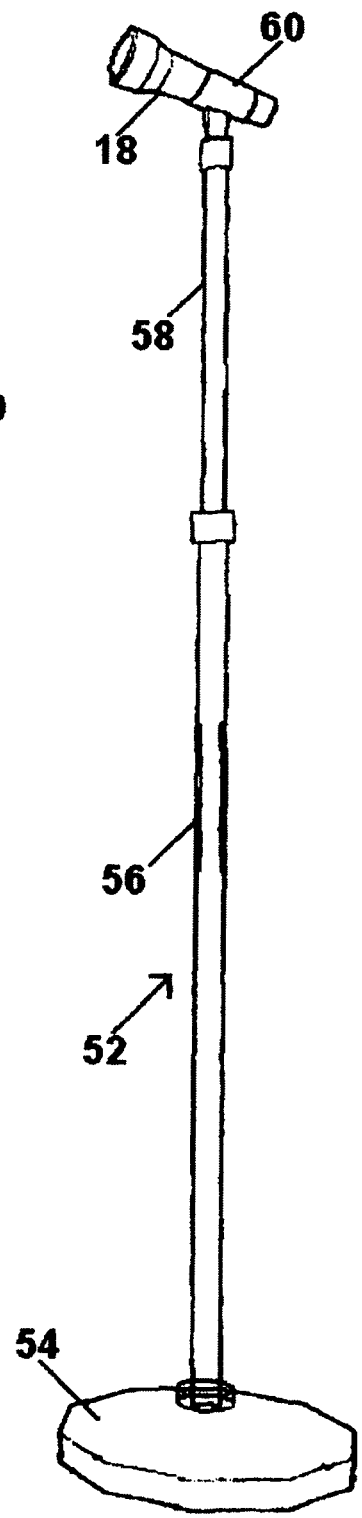
FIG. 4B depicts a usable stand engaged with a handle.

FIG. 4B depicts an embodiment of a stand (52) usable to engage with the handle (18) via a bracket (60) or similar engagement member. In a preferred embodiment of the invention, the handle (18) can have dimensions identical to those of a conventional stage microphone, enabling a conventional microphone stand to be used as a stand for positioning the present photographic flash apparatus. A microphone stand is also typically sufficiently lightweight to enable a photographer to lift and manipulate the stand with one hand to provide extended reach, enabling the photographer to position the photographic flash apparatus above, behind, before, or to either side of the object to be photographed while retaining the camera in a second hand for acquiring photographs.

The stand (52) is depicted having a base (54) for enabling the stand (52) and attached photographic flash apparatus to stand upright. The stand (52) is further shown having an upper segment (58) which telescopingly slides within a lower segment (56) for enabling the stand (52) to provide a variable height for positioning the housing, when upright, and a variable distance between the photographic flash apparatus and the photographer when held manually.

Figure 5:
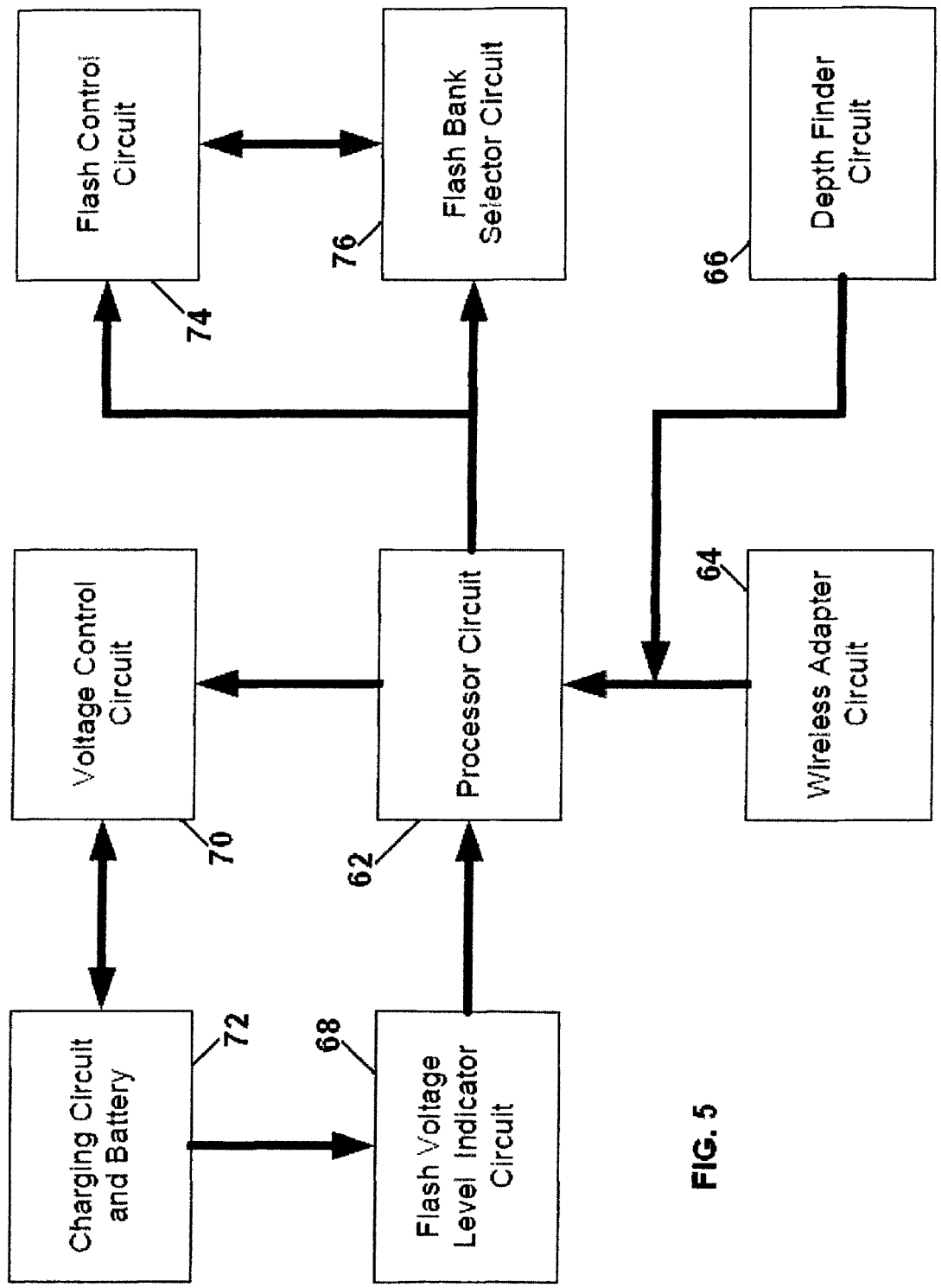
FIG. 5 depicts an embodiment of a power management system usable to prevent flash recycle issues relating to battery life when using the present photographic flash apparatus.

Referring now to FIG. 5, an embodiment of a power management system usable with the present photographic flash apparatus is depicted. Conventionally, in relation to the current charge level of a battery power source, flash devices can often experience delays and other difficulties known as flash recycle effects. These difficulties can be reduced or eliminated when the flash device is powered directly using an AC power source, however, it is impractical to forego the use of batteries and utilize a direct AC connection to power a flash device when acquiring photographic images outside of a studio setting. As such, FIG. 5 depicts a power management system usable to monitor and control the voltage level of one or more battery power sources and responsively control the flash output from one or more flash banks to eliminate flash recycle issues. The depicted power management system can be powered using a separate power source, such as a 9-volt battery or an AC power source, to avoid consuming power from the batteries used to power the flash apparatus.

Specifically, FIG. 5 depicts a processor circuit (62) which includes any type of processor, in communication with one or more data storage media containing computer instructions for instructing the processor to interface with one or more associated circuits. The processor circuit (62) is shown receiving inputs from a wireless adapter circuit (64) and a depth finder circuit (66), used to communicate between the light source and the camera or other associated device, and to analyze and initiate capture of images with a camera or a similar device. The processor circuit (62) functions as a control circuit, which uses information from the depth finder circuit (66) and other circuits to set the voltage level for associated flash banks. The processor circuit (62) can also track the number of charged flash banks and the extent to which the power sources for each flash bank are charged, such that selection of an available flash bank having an appropriate quantity of charge can be selected. The processor circuit (62) can also control the charging of batteries or similar power sources, such as when the system is connected to an AC power source, by permitting or preventing charging of past a certain charge level.

The wireless adapter circuit (64) can be used to connect a flash control circuit (74) to the flash control unit of a camera or similar associated device. In an embodiment of the invention, the wireless adapter circuit (64) can utilize radio, Bluetooth, Zigbee, or other types of wireless connectivity to communicate between the camera and the flash control circuit (74). The depth finder circuit (66) is usable to transmit a signal to an object to be photographed to determine the distance to the object. This calculation is then usable to select a charging voltage for the flash banks.

The processor circuit (62) is also shown receiving input from a flash voltage level indicator circuit (68) which communicates the voltage level of the flash device and/or the battery to the processor circuit (62). The flash voltage level indicator circuit (68) can indicate any number of available flash banks and the voltage level of each flash bank. In an embodiment of the invention, each flash bank can be provided with a selected voltage level, and the flash voltage level indicator circuit (68) can indicate which of the flash can be successfully charged to the selected voltage level.

Responsive to inputs from the flash voltage level indicator circuit (68), the wireless adapter circuit (64), and/or the depth finder circuit (66), the processor circuit (62) causes a voltage control circuit (70) to regulate the voltage to the charging circuit and battery (72), which in turn affects the input provided to the processor circuit (62) by the flash voltage level indicator circuit (68). The voltage control circuit (70) is usable to regulate the voltage stored in any number of flash banks. The voltage levels can be adjusted automatically, such as responsive to input from the depth finder circuit (66), or manually to provide a selected voltage level to one or more flash banks.

When an associated camera or similar device is actuated to capture an image, the processor circuit (62) can then communicate with the flash control circuit (74) and/or a flash bank selector circuit (76) to cause appropriate flash devices to actuate contemporaneously, at a selected time, without exhibiting undesirable flash recycle issues, due to the ability of the processor circuit (62) to control both the voltage of the charging circuit and battery (72), using the voltage control circuit (70), and the flash, using the flash control circuit (74) and/or the flash bank selector circuit (76). The flash control circuit (74) is usable to interface with the flash control circuitry of a camera or similar device to control when voltage from the flash banks is delivered to the light source of the camera. The flash bank selector circuit (76) can monitor the flash banks that are charged and ready to cause a flash, select flash banks in need of charging, and select charged flash banks to cause a subsequent flash on each occasion a flash bank is discharged.

Figure 6:
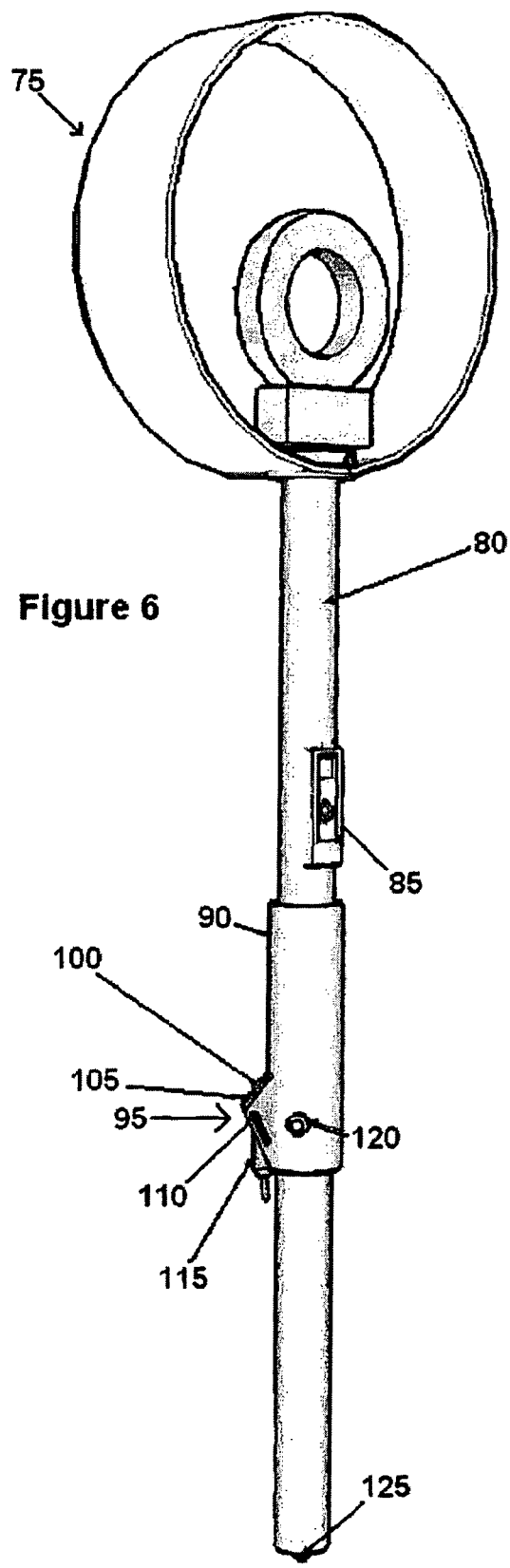
FIG. 6 depicts an embodiment of the present photographic flash apparatus that includes a device bridge having controls for actuating and/or modifying light sources and connectors for accommodating a display device.

Referring now to FIG. 6, an embodiment of the present photographic flash apparatus is depicted, the depicted embodiment including the housing and light source (75), as described previously. The housing and light source (75) are shown engaged with a handle, which in various embodiments of the invention can include telescoping capability.

The handle is shown having a gripping region (90) which can be provided with various indentations, knurling, rubber, leather or similar materials to prevent slipping, urethane, neoprene, or other similar materials to enhance comfort, or combinations thereof. The gripping region (90) is disposed proximate to a device bridge (95) that includes controls for manipulation of the light source within the housing and/or other light sources provided in communication with the apparatus. Specifically, the device bridge (95) is shown having a light volume or dial (100) usable to control the intensity of the light within the housing or other light sources and an on/off switch (105) used to actuate one or more light sources. Indicator lights (110) are also shown disposed on the device bridge (95) for indicating the charge state of one or more light sources. A wireless transmitter and recessed stereo plug (115) are also provided proximate to the device bridge (95) for enabling wireless and/or direct communication with one or more light sources, cameras, and/or other associated devices.

The handle is further shown having a bounded region with connections for attachment of a display device (85), which can include any manner of portable audio or video device, such as a cellular telephone, an I-pod®, or similar apparatus. Photographs acquired through use of the present apparatus can be automatically stored, displayed, and/or manipulated using the display device (85). The handle is also provided with speakers (80), or other audio output apparatuses, which are usable to transmit video files stored within the display device (85) should the display device (85) include audio capabilities. In an embodiment of the invention, the device bridge (95) can include controls for manipulation of the audio output produced by the speakers (80), and/or for manipulation of the display produced by the display device (85).

To facilitate carrying and transport, the depicted embodiment of the present apparatus is also shown including fasteners (120, 125) for accommodating a carrying strap, handle, or similar means by which the apparatus can be secured to the body. While FIG. 6 depicts the fasteners (120, 125) as buttons adapted to engage complementary slits in a strap, it should be understood that any manner of fastener, connector, or carrying member can be used within the scope of the invention. Use of carrying members that enable the apparatus to be secured to the body are especially advantageous due to the fact that a user can release the apparatus and allow it to hang from his or her body, effectively freeing the user's hands to manipulate other lights, cameras, or apparatuses, or to carry other equipment.

While these embodiments have been described with emphasis on the embodiments, it should be understood that within the scope of the appended claims, the embodiments might be practiced other than as specifically described herein.

What is claimed is:

1. A flash apparatus comprising:
a housing comprising a generally concave reflector;
a light source disposed within the generally concave reflector; and
a synchronization device in communication with the light source and a photographic device remote from the housing and the light source, wherein the synchronization device causes the light source to emit a flash of light when the photographic device is actuated.

2. The apparatus of claim 1, wherein the generally concave reflector comprises a circular reflector, a dimpled reflector, a white reflector, a parabolic reflector, a polished reflector, a gold reflector, or combinations thereof.

3. The apparatus of claim 1, wherein the light source comprises a circular or ring-shaped bulb.

4. The apparatus of claim 3, where in the circular or ring-shaped bulb is oriented to emit the flash of light toward the generally concave reflector for providing reflected light.

5. The apparatus of claim 3, where in the circular or ring-shaped bulb is oriented to emit the flash of light away from the generally concave reflector for providing direct and reflected light.

6. The apparatus of claim 3, further comprising a portable power source adapted to provide power to the circular or ring-shaped bulb.

7. The apparatus of claim 6, further comprising a power management system in communication with the portable power source and the circular or ring-shaped bulb, wherein the power management system comprises a processor, control circuitry, and computer instructions for instructing the processor to control actuation of the circular or ring-shaped bulb responsive to input from the portable power source.

8. The apparatus of claim 1, wherein the light source comprises an adjustable light source for selectively adjusting the intensity of the flash of light.

9. The apparatus of claim 1, wherein the synchronization device comprises a wireless synchronization device.

10. The apparatus of claim 1, further comprising a modifier disposed over the generally concave reflector for modifying the flash of light.

11. The apparatus of claim 10, wherein the modifier comprises a diffuser, a grid, a snoot, a beam, a diffuser having an opaque center, or combinations thereof.

12. The apparatus of claim 1, further comprising a handle secured to the housing, a handle secured to the light source through an opening disposed through the housing, or combinations thereof, for facilitating manual positioning and repositioning of the housing and the light source during use.

13. The apparatus of claim 12, wherein the handle secured to the light source comprises a rotatable mount adapted to engage the light source for enabling rotation of the light source to selectively emit the flash of light toward the generally circular concave reflector, away from the generally circular concave reflector, or in a direction therebetween.

14. The apparatus of claim 12, wherein the housing, the handle, or combinations thereof, further comprise electrical contacts for engaging the light source, and wherein the electrical contacts comprise a cold shoe, a hot shoe, or combinations thereof.

15. A portable system for manual illumination of a subject, the system comprising:
an interchangeable generally circular concave reflector;
a handle for facilitating manual positioning and repositioning of the interchangeable generally circular concave reflector during use, wherein the handle is disposed through a side opening, and wherein the handle comprises a first portion extending within the interchangeable generally circular concave reflector and a second portion extending exterior to the interchangeable generally circular concave reflector;
an interchangeable light source mounted to the first portion of the handle within the generally circular concave reflector, wherein the interchangeable light source is in communication with a synchronization device for causing the interchangeable light source to emit a flash of light upon actuation of a device in communication with the synchronization device; and
an interchangeable modifier disposed over the interchangeable generally circular concave reflector for modifying the flash of light from the interchangeable light source.

16. The system of claim 15, wherein the generally circular concave reflector comprises a dimpled reflector, a white reflector, a polished reflector, a parabolic reflector, a gold reflector, or combinations thereof.

17. The system of claim 15, wherein the interchangeable light source comprises a tubular light source, a round or spherical light source, a circular or ring-shaped light source, or combinations thereof.

18. The system of claim 17, further comprising a portable power source adapted to provide power to the circular or ring-shaped light source.

19. The system of claim 18, further comprising a power management system in communication with the portable power source and the circular or ring-shaped light source, wherein the power management system comprises a processor, control circuitry, and computer instructions for instructing the processor to control actuation of the circular or ring-shaped bulb responsive to input from the portable power source.

20. The system of claim 15, wherein the interchangeable light source comprises an adjustable light source for selectively adjusting the intensity of the flash of light.

21. The system of claim 15, wherein the interchangeable modifier comprises a diffuser, a grid, a snoot, a beam, a circular diffuser having an opaque center, or combinations thereof.

22. The system of claim 15, wherein the first portion of the handle comprises a rotatable mount adapted to engage the interchangeable light source for enabling rotation of the interchangeable light source to selectively emit the flash of light toward the interchangeable generally circular concave reflector, away from the interchangeable generally circular concave reflector, or in a direction therebetween.

23. The system of claim 15, wherein the first portion of the handle further comprises electrical contacts for engaging the interchangeable light source, and wherein the electrical contacts comprise a cold shoe, a hot shoe, a synchronization connection, or combinations thereof.

24. The system of claim 15, wherein the interchangeable light source and the handle are an integral, one-piece unit.

25. The system of claim 15, wherein the handle comprises dimensions for engagement with a portable mounting device.

26. The system of claim 25, wherein the portable mounting device comprises a microphone stand.

27. A handheld flash apparatus comprising:
a housing comprising an interior surface, a front opening, and a bottom opening, wherein the interior surface comprises a generally circular concave reflector;
a handle for facilitating manual positioning and repositioning of the generally circular concave reflector during use, wherein the handle is disposed through the side opening, and wherein the handle comprises a first portion extending within the generally circular concave reflector and a second portion extending exterior to the generally circular concave reflector;

a circular light source secured to the first portion of the handle and disposed within the generally circular concave reflector, wherein the circular light source can be selectively oriented to emit light toward the generally circular concave reflector for providing reflected light or to emit light away from the generally circular concave reflector for providing direct and reflected light;

a synchronization device in communication with the circular light source and a photographic device remote from the housing and the circular light source, wherein the synchronization device causes the circular light source to emit a flash of light when the device is actuated; and a modifier disposed over the front opening of the housing for modifying the flash of light emitted by the circular light source.

28. The apparatus of claim 27, wherein the generally circular concave reflector comprises a dimpled reflector, a white reflector, a polished reflector, a parabolic reflector, a gold reflector, or combinations thereof.

29. The apparatus of claim 27, further comprising a portable power source adapted to provide power to the circular light source.

30. The apparatus of claim 29, further comprising a power management system in communication with the portable power source and the circular or ring-shaped bulb, wherein the power management system comprises a processor, control circuitry, and computer instructions for instructing the processor to control actuation of the circular or ring-shaped bulb responsive to input from the portable power source.

31. The apparatus of claim 27, wherein the circular light source comprises an adjustable circular light source for selectively adjusting the intensity of the flash of light.

32. The apparatus of claim 27, wherein the synchronization device comprises a wireless synchronization device.

33. The apparatus of claim 27, wherein the modifier comprises a diffuser, a grid, a snoot, a beam, a circular diffuser having an opaque center, or combinations thereof.

34. The apparatus of claim 27, wherein the handle comprises a rotatable mount adapted to engage the circular light source for enabling rotation of the circular light source to selectively emit the flash of light toward the generally circular concave reflector, away from the generally circular concave reflector, or in a direction therebetween.

35. The apparatus of claim 27, wherein the first portion of the handle further comprises electrical contacts for engaging the circular light source, and wherein the electrical contacts comprise a hot shoe.

* * * * *